(12) United States Patent  
Ishimine et al.

(10) Patent No.: US 10,139,581 B2  
(45) Date of Patent: Nov. 27, 2018

(54) PATCH PANEL

(71) Applicant: SANWA DENKI KOGYO CO., LTD., Tokyo (JP)

(72) Inventors: Nobuo Ishimine, Tokyo (JP); Masanori Sato, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/949,121

(22) Filed: Apr. 10, 2018

(65) Prior Publication Data

US 2018/0314024 A1 Nov. 1, 2018

(30) Foreign Application Priority Data

Apr. 27, 2017 (JP) .................................. 2017-088612

(51) Int. Cl.
| | | |
|---|---|---|
| *G02B 6/00* | (2006.01) | |
| *G02B 6/44* | (2006.01) | |
| *H01R 13/514* | (2006.01) | |
| *H01R 13/74* | (2006.01) | |
| *H01R 13/518* | (2006.01) | |

(52) U.S. Cl.
CPC ......... *G02B 6/4452* (2013.01); *H01R 13/514* (2013.01); *H01R 13/518* (2013.01); *H01R 13/743* (2013.01)

(58) Field of Classification Search
None
See application file for complete search history.

(56) References Cited

U.S. PATENT DOCUMENTS

2009/0274431 A1* 11/2009 Krampotich ......... G02B 6/4452  
385/135  
2011/0008996 A1 1/2011 Pinn et al.

FOREIGN PATENT DOCUMENTS

| EP | 2457293 A1 | 5/2012 |
| EP | 2457293 B1 | 5/2012 |
| JP | 2000331739 A | 11/2000 |

OTHER PUBLICATIONS

European Search Report in corresponding European Application No. 18167534.9 dated Sep. 3, 2018.

* cited by examiner

*Primary Examiner* — Chris Chu

(74) *Attorney, Agent, or Firm* — Bacon & Thomas, PLLC

(57) ABSTRACT

Provided is a patch panel (11) on which a plurality of mounting frames (1A,1B), to which various kinds of adapters including a LC adapter (Q1) and a SC adapter (Q2) for electrical or optical communication, and a modular adapter (Q3) for telephone are attached by appropriately combining the adapters, are mounted in an insertable manner through a window opening (12) from the front side of the patch panel (11). The patch panel (11) is provided with a window frame (12) set to a predetermined length dimension so that the mounting frames (1A,1B) having a port specification different from one another can be mounted in a mixed manner in array by a reasonable number.

3 Claims, 20 Drawing Sheets

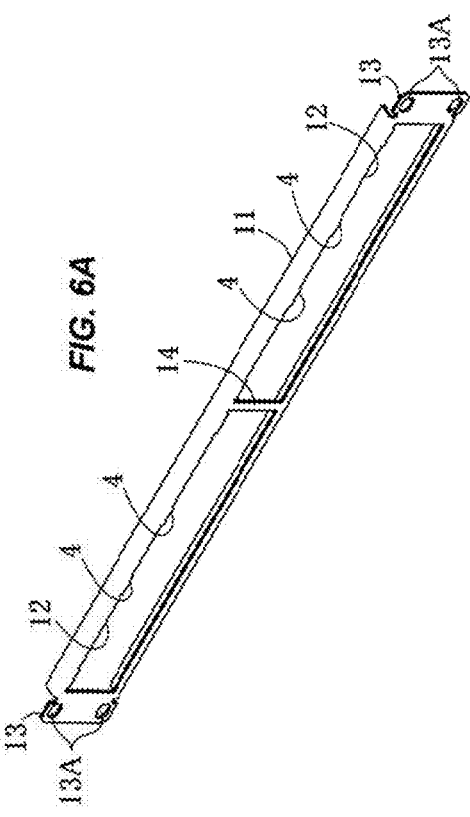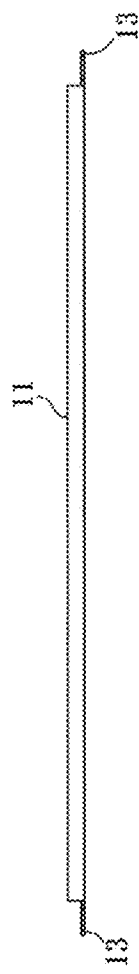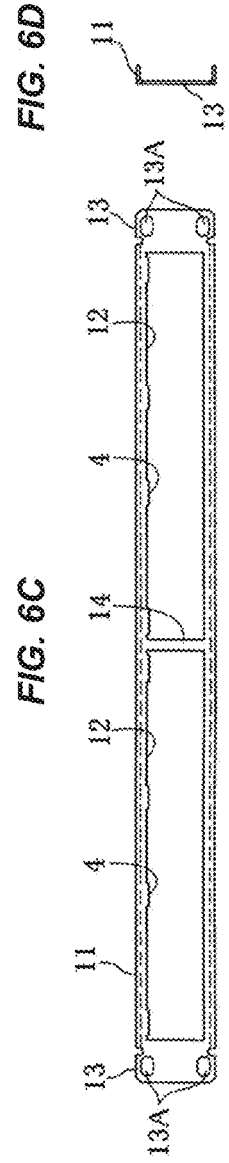

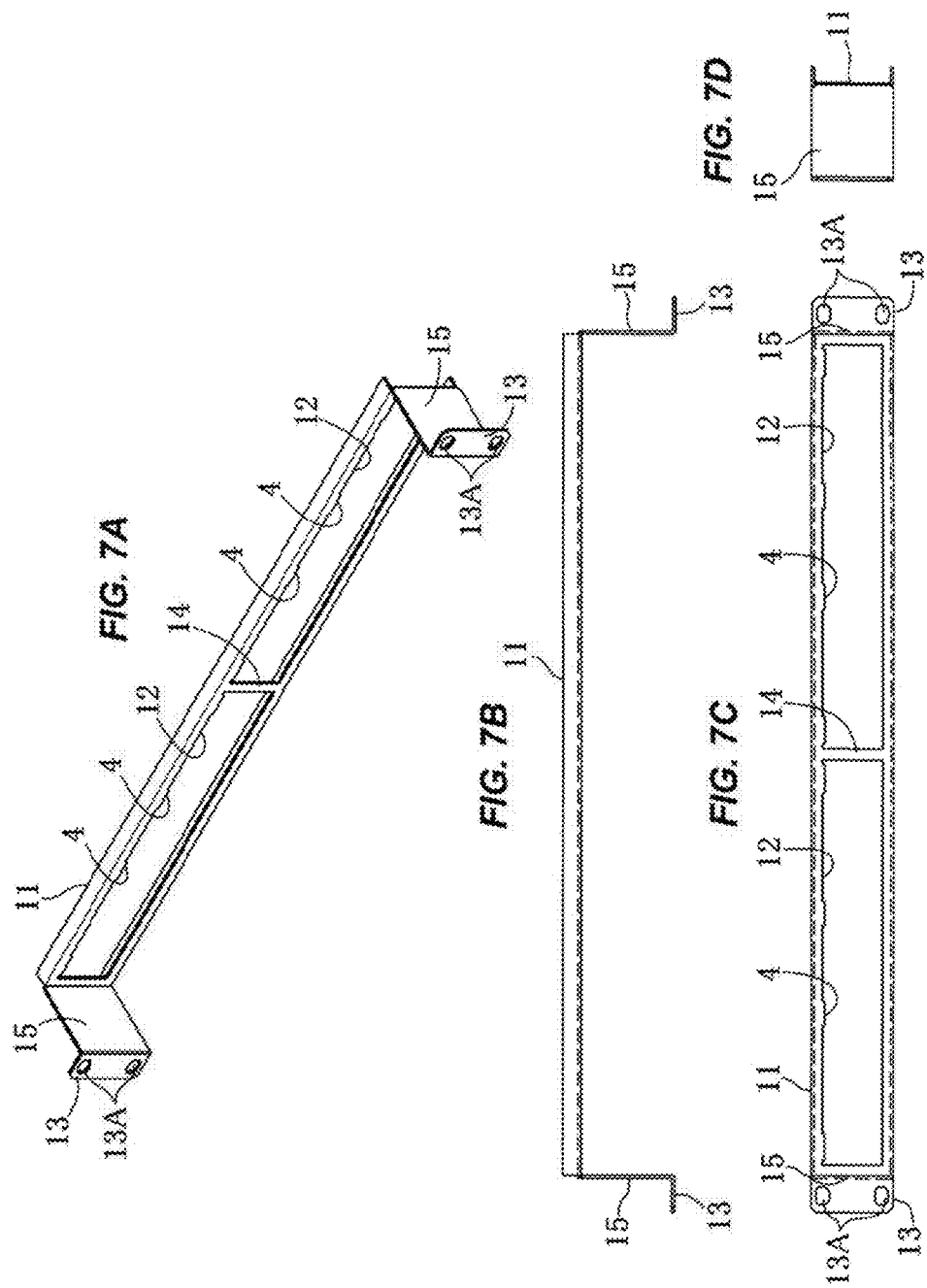

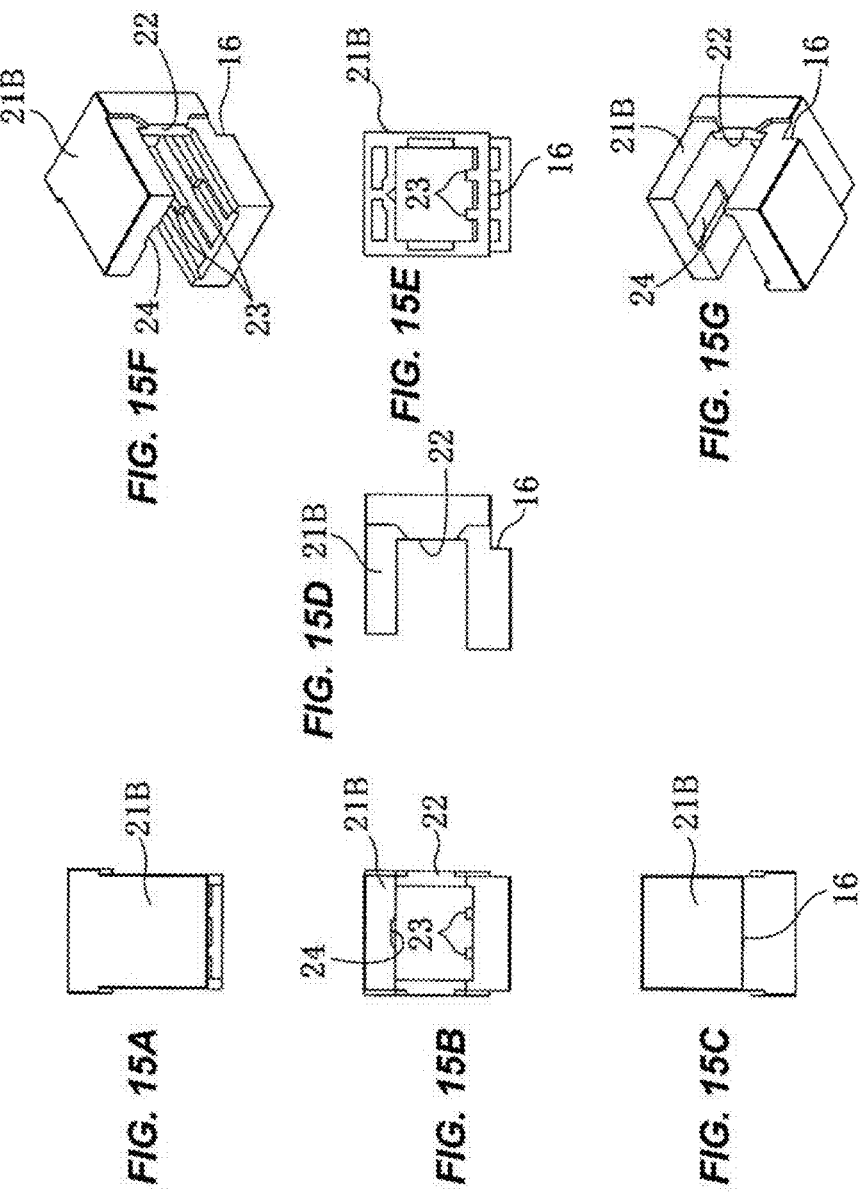

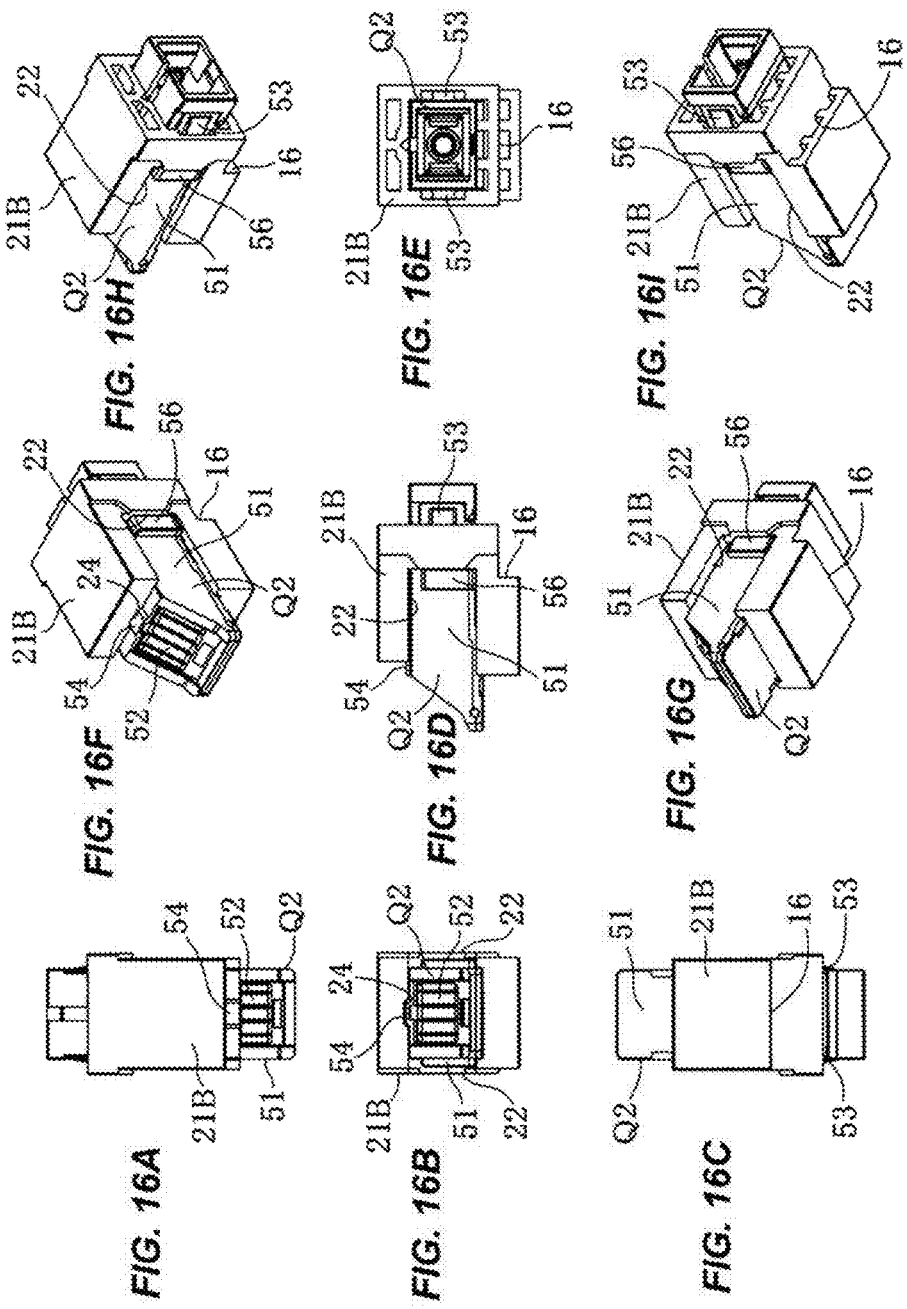

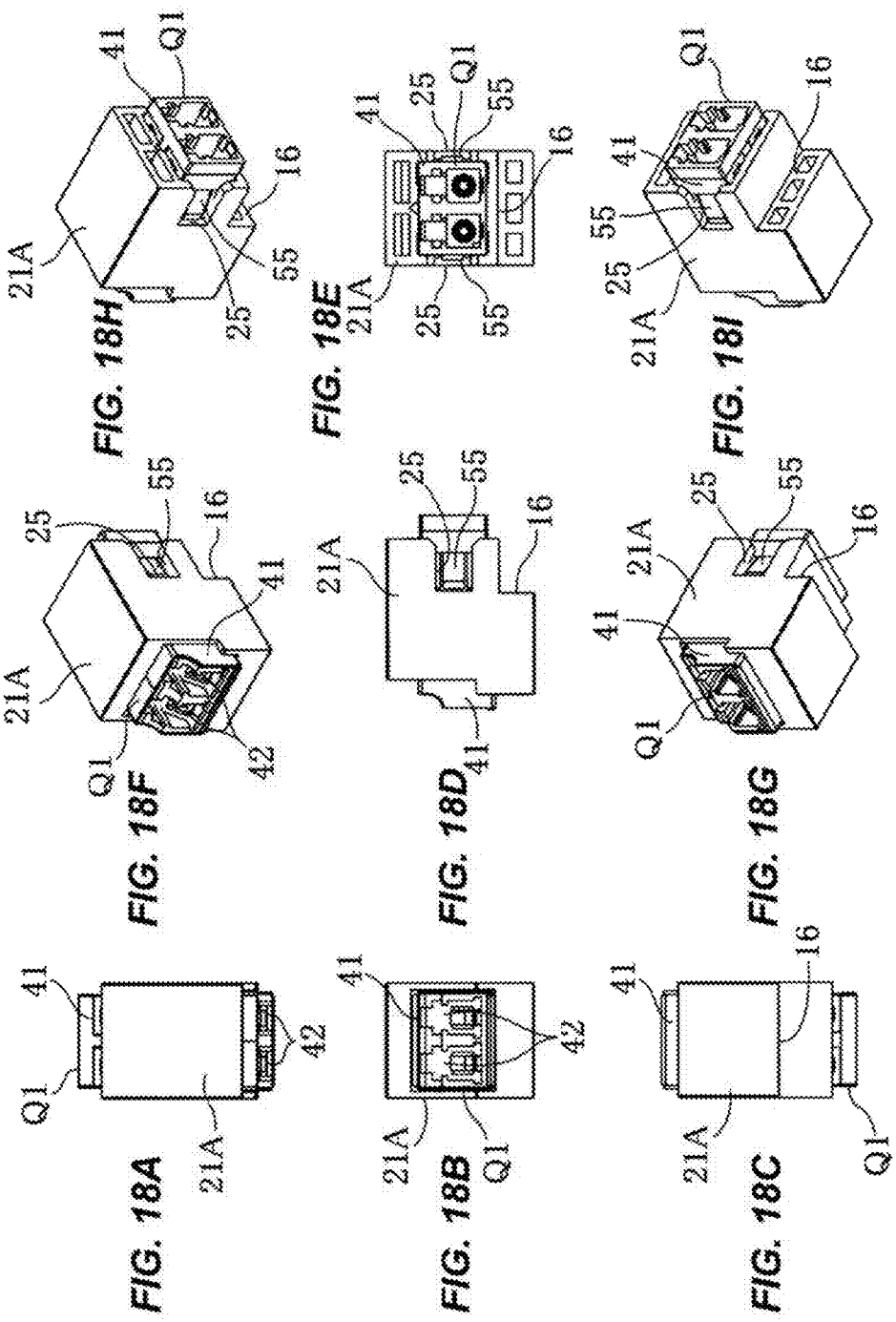

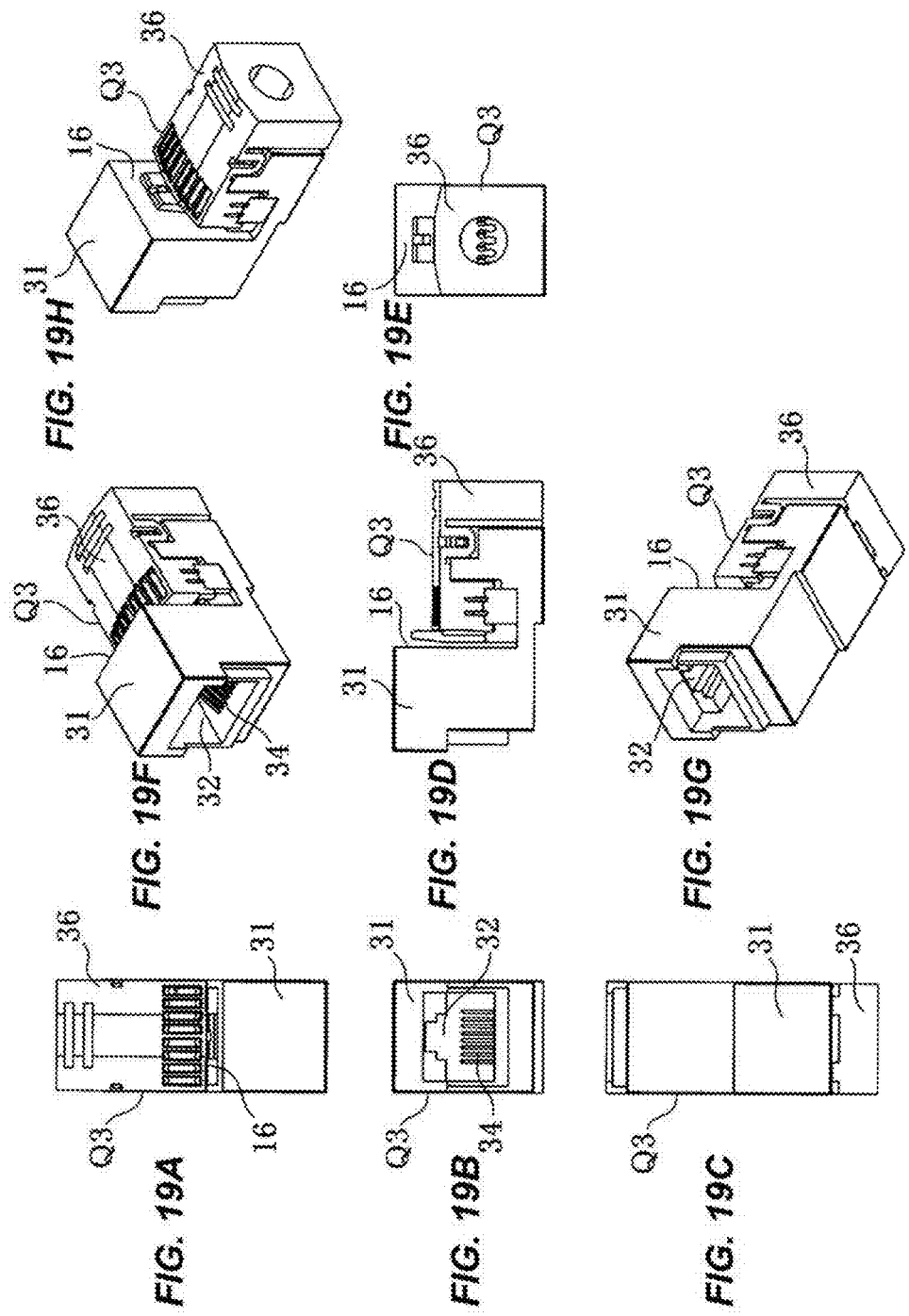

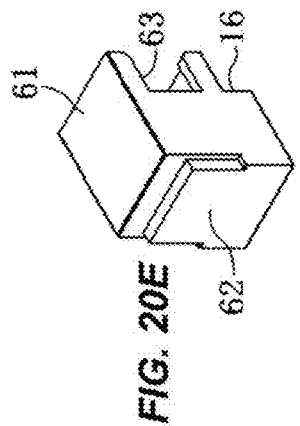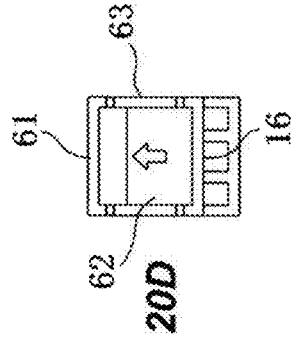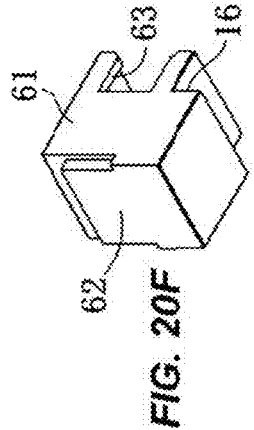
FIG. 20E   FIG. 20D   FIG. 20F
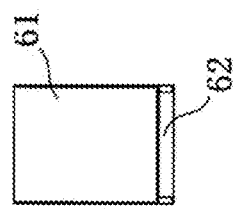
FIG. 20C
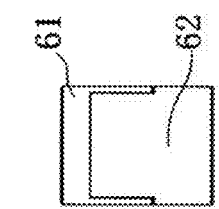
FIG. 20A   FIG. 20B

PATCH PANEL

TECHNICAL FIELD

The present invention relates to a patch panel to which various kinds of adapters including a SC adapter or a LC adapter for electrical or optical communication, and a modular adapter for telephone are attached by appropriately combining the adapters in an information wiring system.

BACKGROUND ART

Conventionally, an information wiring system using a twisted-pair cable has been widely used in an office or in a factory to transmit different kinds of information such as an audio signal, a digital signal for LAN, and a picture signal. In this connection, a twisted-pair cable around which a shield is not applied is referred to as a UTP (Unshielded Twisted-Pair) cable. The UTP cable has been normally used for a LAN application of Ethernet (Registered Trademark) which is not asked for performing a high speed transmission, especially by virtue of easy handling and low cost thereof, in addition to a telephone line and the Ethernet (Registered Trademark). In such an information wiring system, it has been used a junction terminal board to support a wiring work of network called as a patch panel in preparation for a case where a change in the information wiring is needed due to a layout change in office.

Specifically, a patch panel to which a modular adapter for telephone disclosed in the PATENT LITERATURE 1 is attached is publicly known. The patch panel is configured by mounting four mounting frames (cover serving as holding member) which hold side by side in a row six modular adapters (twenty-four modular adapters in total) to which a modular plug is removably connected, and by installing the patch panel in a fixed part such as a rack.

When the mounting frames, to which the modular adapter is attached, are mounted on the patch panel, the mounting frames are first tilted and inserted from the front side into a window opening formed in the patch panel. Then, when a projection which is provided in a protruding manner on an abutting piece provided on the inside of a lower edge part of the mounting frames is inserted into a through hole of the patch panel, an opening edge of the through hole is clamped in a groove between the front of the mounting frames and the projection. After that, when an upper part of the mounting frames is inserted into the window opening of the patch panel, with the opening edge as an axis, a fitting claw which is provided in a protruding manner on an upper surface of an end of an engaging piece provided toward the inside of an upper edge part of the mounting frames abuts against the opening edge of the patch panel, and is downwardly pressed and bent. Thereafter, the fitting claw crosses over the opening edge to engage with the back side of the window opening, and is fixed to the window opening of the patch panel.

Meanwhile, when the mounting frames are unmounted from the patch panel, a tip of a tool such as a flathead screwdriver is inserted between a tool insertion groove formed in the front of the mounting frames and a recess formed in the patch panel, and then a downward force is applied to the engaging piece. This releases the fitting state between the fitting claw and the opening edge, thereby unmounting the mounting frames from the patch panel.

CITATION LIST

Patent Literature

PATENT LITERATURE 1: Japanese Patent No. 3482907

SUMMARY OF INVENTION

Technical Problem

However, the mounting frames disclosed in the PATENT LITERATURE 1 are not for attaching the SC adapter and the LC adapter for electrical or optical communication in the information wiring system, but for collectively attaching at once six ports (six) of the modular adapter for telephone.

Further, in the PATENT LITERATURE 1, the four mounting frames (six port frame) having a six port specification, on which the six modular adapters for telephone are held side by side in a row, are mounted side by side in a row on the patch panel (twenty-four modular adapters in total). A cord connected to the adapters correspondingly to every six port of the respective mounting frames is made into a bundle of six cords by a fastening band such as an insulock so as to prevent the cord of a plug from being crossed in a disorderly fashion and intertangled with one another.

Meanwhile, there exists a patch panel of a particular type on which six mounting frames having a four port specification are mounted. However, the following problem still remains unresolved. Specifically, when in the patch panel of this type, the six mounting frames, with the plug being respectively directly connected to the four adapters of the mounting frames, are mounted side by side in a row on the patch panel, two cords out of the cords made into a bundle of six cords extend over the mounting frames (six port frame) adjacent to each other.

Thus, the invention disclosed in the PATENT LITERATURE 1 is not intended to mount on the patch panel in a juxtaposed manner by appropriately combining the two kinds of port frames including the mounting frame (four port frame) having a four port specification and the mounting frame (six port frame) having a six port specification. Therefore, when the mounting frames are unmounted from the patch panel. with the plug respectively corresponding to a cord end being connected to the various kinds of adapters including e.g. the modular adapter for telephone, and the SC adapter and the LC adapter for electrical or optical communication, the mounting frames adjacent thereto are also forced to be unmounted simultaneously, as mentioned above, as long as the mounting frames are in a state where a part of the cords bundled together extends over the adjacent mounting frames. Accordingly, a change in the information wiring and a maintenance work e.g. due to a layout change in office become extremely complicated.

The present invention is made in view of the above circumstances existing in the above PATENT LITERATURE 1, and an object thereof is to provide a patch panel which can obviate a situation where a part of the bundled cords extends over the mounting frames adjacent to each other mounted on the patch panel. For example, when the mounting frames are unmounted from the front of the patch panel, with the plug respectively corresponding to the code end being connected to the various kinds of adapters including the modular adapter for telephone, and the SC adapter and the LC adapter for electrical or optical communication at the time of a change in the information wiring and a maintenance work e.g. due to a layout change in office, the present invention allows an extremely convenient patch panel to be provided, which is able to individually and smoothly unmount each of the mounting frames having a port specification different from one another from the front side of the patch panel.

Solution to Problem

In order to solve the above technical problems, the present invention includes the patch panel on which a plurality of mounting frames, to which various kinds of adapters including a SC adapter and a LC adapter for electrical or optical communication, and a modular adapter for telephone are attached by appropriately combining the adapters, are mounted in an insertable manner through a window opening from the front side of the patch panel, wherein the patch panel is provided with the window opening set to a predetermined length dimension so that the mounting frames having a port specification different from one another can be mounted by combining the mounting frames in array by a reasonable number.

Further, the mounting frames having the port specification different from one another are two types of port frames including a mounting frame having a four port specification (four port frame) and a mounting frame having a six port specification (six port frame), and these mounting frames are mounted by combining the mounting frames in array by a reasonable number on the window opening of the patch panel so that the number of the port comes to twenty-four in total.

Furthermore, the patch panel includes a cut-out part formed substantially in the center of a lower edge end of the mounting frames, an engaged part having elasticity which is bridged over so as to extend over the inside of the cut-out part in a state where the both ends thereof are fixed to the inside of the lower edge end of the mounting frame, and whose center is freely flexible in a vertical direction, and a engaging claw provided in a protruding manner in an lower surface of the engaged part so as to engage with a lower side opening edge of the window opening of the patch panel, and wherein the engagement by the engaging claw with the lower side opening edge of the window opening of the patch panel is disengaged by upwardly bending the center of the engaged part through the cut-out part of the mounting frames.

Moreover, the various kinds of adapters including the SC adapter and the LC adapter for electrical or optical communication, and the modular adapter for telephone are inserted from the back into an opening frame corresponding to a port provided in a row in the mounting frames through attachments corresponding to the respective adapters, and the opening frame is provided with a latch piece opposed to the engaging part formed in a wall surface of the respective attachments, and the latch piece is engaged by the engaging part of the opening frame when the adapters are inserted from the back into the opening frame.

According to the present invention, the invention can obviate a situation where a part of the bundled cords extends over the mounting frames adjacent to each other mounted on the patch panel. For example, at the time of a change in the information wiring and a maintenance work due to a layout change in office, when the mounting frames are unmounted from the front of the patch panel, with the plug respectively corresponding to the code end being connected to the various kinds of adapters including the modular adapter for telephone, and the SC adapter and the LC adapter for electrical or optical communication, the present invention enables individual and smooth unmounting of the mounting frames having a port specification different from one another from the front side of the patch panel.

Accordingly, the patch panel according to the present invention provides extremely good usability.

Namely, in the present invention, there is provided the patch panel on which a plurality of mounting frames, to which various kinds of adapters including a SC adapter and a LC adapter for electrical or optical communication, and a modular adapter for telephone are attached by appropriately combining the adapters, are mounted in an insertable manner through a window opening from the front side of the patch panel, wherein the patch panel is provided with the window opening set to a predetermined length dimension so that the mounting frames having a port specification different from one another can be mounted by combining the mounting frames in array by a reasonable number.

The arrangement thus configured as above can obviate a troublesome work that when the mounting frames are unmounted from the front of the patch panel, with the plug of the cord end being connected, as is conventionally done, the adjacent mounting frames in a state where a part of the cords bundled together extends over the mounting frames are also forced to be simultaneously unmounted.

Further, the mounting frames having a port specification different from one another are two types of port frames including a mounting frame having a four port specification (four port frame) and a mounting frame having a six port specification (six port frame), and these mounting frames are mounted by combining the mounting frames in array by a reasonable number on the window opening of the patch panel so that the number of the port comes to twenty-four in total.

The arrangement thus configured as above can obviate a situation where a part of the bundled cords respectively corresponding to the four ports and the six ports extends over the mounting frames adjacent to each other, thereby allowing individual and smooth unmounting of the mounting frames having different two port specifications including the four ports and the six ports from the front side of the patch panel.

Furthermore, the patch panel includes a cut-out part formed substantially in the center of a lower edge end of the mounting frames, an engaged part having elasticity which is bridged over so as to extend over the inside of the cut-out part in a state where the both ends thereof are fixed to the inside of the lower edge end of the mounting frame, and whose center is freely flexible in a vertical direction, and an engaging claw provided in a protruding manner in an lower surface of the engaged part so as to engage with a lower side opening edge of the window opening of the patch panel, and wherein the engagement by the engaging claw with the lower side opening edge of the window opening of the patch panel is disengaged by upwardly bending the center of the engaged part through the cut-out part of the mounting frames.

The arrangement thus configured as above allows easy and smooth unmounting of the mounting frames from the front side of the patch panel with the plug, with the cord being connected to the various kinds of adapters.

Additionally, the various kinds of adapters including the SC adapter and the LC adapter for electrical or optical communication, and the modular adapter for telephone are inserted from the back into an opening frame corresponding to a port provided in a row in the mounting frames through attachments corresponding to the respective adapters, and the opening frame is provided with a latch piece opposed to the engaging part formed in a wall surface of the respective attachments, and the latch piece is engaged by the engaging part of the opening frame when the adapters are inserted from the back into the opening frame.

The arrangement thus configured as above allows the various kinds of adapters having an outer wall shape different from one another to be commonly attached to the opening frame of the mounting frames having the same structure, thereby enabling low-cost mass production of the mounting frames with a simple structure.

BRIEF DESCRIPTION OF DRAWINGS

FIGS. 3A to 3B are a perspective view of the patch panel on which the mounting frames having four port and six port specifications, to which the various kinds of adapters are attached, are mounted by combining the mounting frames, in which FIG. 3A is a front view and FIG. 3B is a bottom view.

FIGS. 4A to 4D show a procedure of unmounting the mounting frames from the patch panel, in which FIG. 4A is a cross-sectional view taken along line A-A of FIG. 3A in a locked state, FIG. 4B is a cross-sectional view taken along line A-A of FIG. 3A in a locked pushing-up sate, FIG. 4C is a cross-sectional view taken along line A-A of FIG. 3A in an unlocked state, and FIG. 4D is a cross-sectional view taken along line B-B of FIG. 3B in a locked state.

FIGS. 6A to 6D show one example of the patch panel on which the mounting frames are mounted, in which FIG. 6A is a perspective view, and FIG. 6B is a plan view, FIG. 6C is a front view, and FIG. 6D is a side view.

FIGS. 7A to 7D show another example of the patch panel on which the mounting frames are mounted, in which FIG. 7A is a perspective view, FIG. 7B is a plan view, FIG. 70 is a front view, and FIG. 7D is a side view.

FIGS. 8A to 8E show one example of the mounting frames having a six port, in which FIG. 8A is a plan view, FIG. 8B is a front view, FIG. 8C is a bottom view, FIG. 8D is a rear view, and FIG. 8E is a side view.

FIGS. 9A to 9C show one example of the mounting frames having a six port, in which FIG. 9A is a perspective view seen from a front upper diagonal direction, FIG. 9B is a perspective view seen from a rear upper diagonal direction, and FIG. 9C is a respective view seen from a rear lower diagonal direction.

FIGS. 10A to 10E show one example of the mounting frames having a four port, in which FIG. 10A is a plan view, FIG. 10B is a front view, FIG. 10C is a bottomview, FIG. 10D is a rear view, and FIG. 10E is a side view.

FIGS. 11A to 11C show one example of the mounting frames having a four port specification, in which FIG. 11A is a perspective view seen from a front upper diagonal direction, FIG. 11B is a perspective view seen from a rear upper diagonal direction, and FIG. 11C is a perspective view seen from a rear lower diagonal direction.

FIGS. 15A to 15G show one example of attachments for the SC adapter mounted on the mounting frames, in which FIG. 15A is a plan view, FIG. 15B is a front view, FIG. 15C is a bottom view, FIG. 15D is a side view, FIG. 15E is a rear view, FIG. 15F is a perspective view seen from a rear upper diagonal direction, and FIG. 15G is a perspective view seen from a rear lower diagonal direction.

FIGS. 16A to 16I show a state where the SC adapter is attached to the attachment, in which FIG. 16A is a plan view, FIG. 16B is a front view, FIG. 16C is a bottom view, FIG. 16D is a side view, FIG. 16E is a rear view, FIG. 16F is a perspective view seen from a front upper diagonal direction, FIG. 16G is a perspective view seen from a front lower diagonal direction, FIG. 16H is a perspective view seen from a rear upper diagonal direction, and FIG. 16I is a perspective view seen from a rear lower diagonal direction.

FIGS. 17A to 17G show one example of the attachments for the LC adapter mounted on the mounting frames, in which FIG. 17A is a plan view, FIG. 17B is a front view, FIG. 17C is a bottom view, FIG. 17D is a side view, FIG. 17E is a rear view, FIG. 17F is a perspective view seen from a rear upper diagonal direction, and FIG. 17G is a perspective view seen from a rear lower diagonal direction.

FIGS. 18A to 18I show a state where the LC adapter is attached to the attachment, in which FIG. 18A is a plan view, FIG. 18B is a front view, FIG. 18C is a bottom view, FIG. 18D is a side view, FIG. 18E is a rear view, FIG. 18F is a perspective view seen from a front upper diagonal direction, FIG. 18G is a perspective view seen from a front lower diagonal direction, FIG. 18H is a perspective view seen from a rear upper diagonal direction, and FIG. 18I is a perspective view seen from a rear lower diagonal direction.

FIGS. 19A to 19H show a state where the modular adapter for telephone is attached to the attachment, in which FIG. 19A is a plan view, FIG. 19B is a front view, FIG. 19C is a bottom view, FIG. 19D is a side view, FIG. 19E is a rear view, FIG. 19F is a perspective view seen from a front upper diagonal direction, FIG. 19G is a perspective view seen from a front lower diagonal direction, and FIG. 19H is a perspective view seen from a rear upper diagonal direction.

FIGS. 20A to 20F show one example of a dummy cap attached to a part where the adapter is not attached to the mounting frames, in which FIG. 20A is a plan view, FIG. 20B is a front view, FIG. 20C is a side view, FIG. 20D is a rear view, FIG. 20E is a perspective seen from a front upper diagonal direction, and FIG. 20F is a perspective view seen from a front lower diagonal direction.

DESCRIPTION OF EMBODIMENT

Hereinafter, a description will be given in detail of an embodiment of a patch panel according to the present invention with reference to the accompanying drawings.

<External Appearance of Patch Panel>

Figure 1:
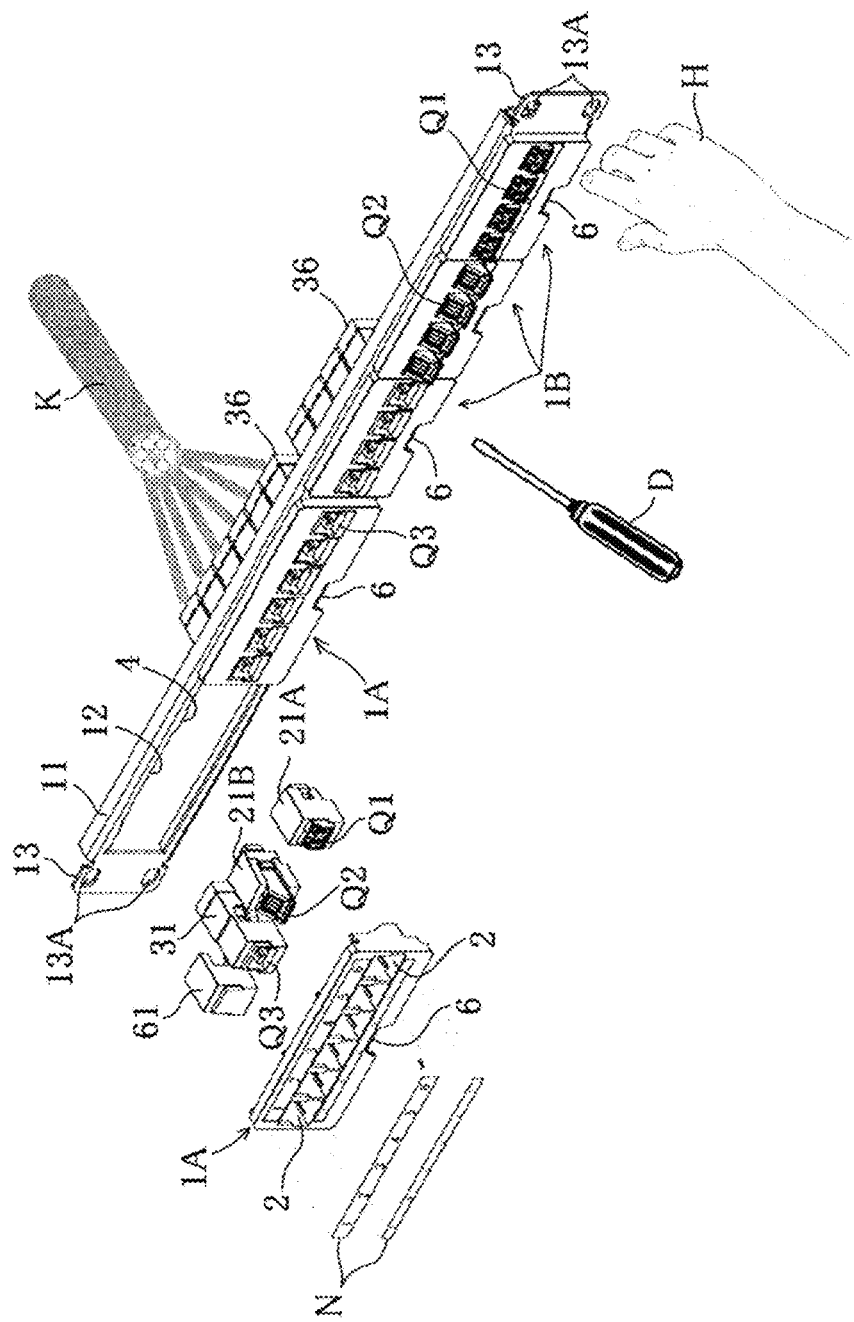
FIG. 1 is a perspective view showing a state where a part of mounting frames of the patch panel and various kinds of adapters according to one embodiment for carrying out the present invention are decomposed.
Figure 2:
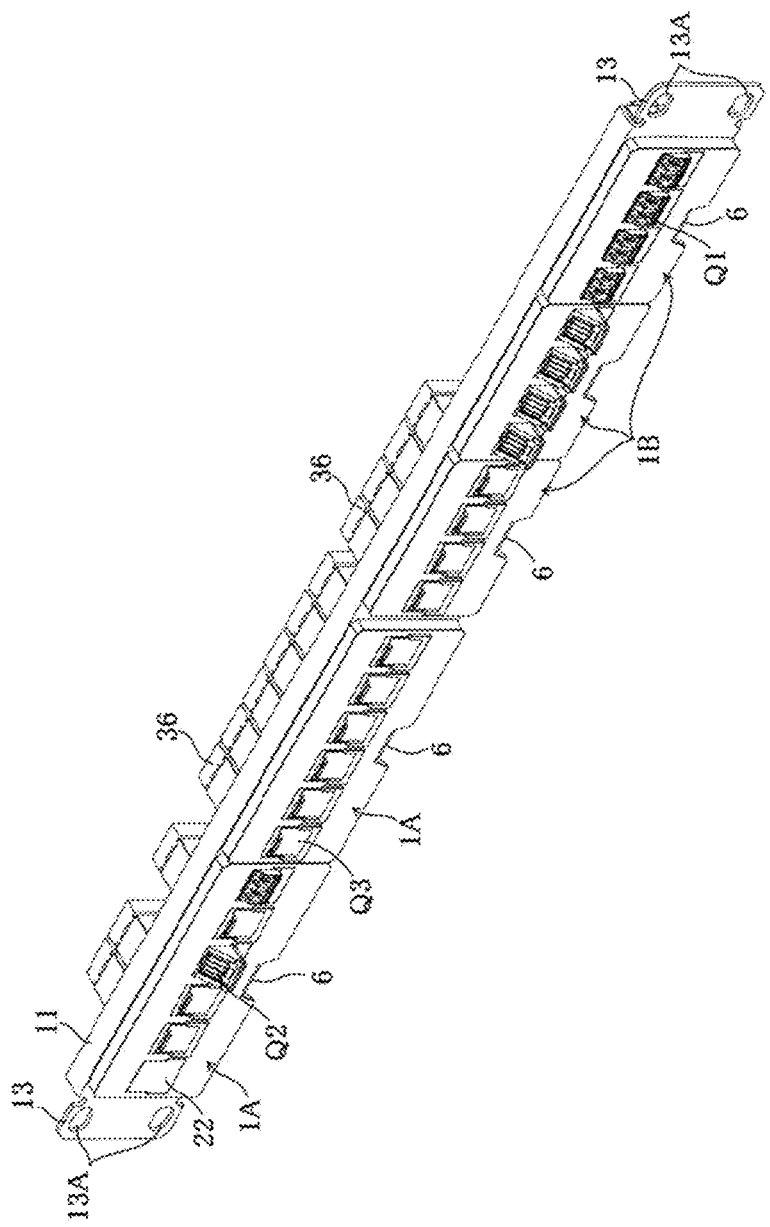
FIG. 2 is a perspective view of the patch panel on which the mounting frames having four port and six port specifications, to which the various kinds of adapters are attached, are mounted by combining the mounting frames.

As shown in FIG. 1, a patch panel 11 in the present embodiment is configured such that a plurality of mounting frames 1A and 1B which hold various kinds of adapters including a LC adapter Q1 and a SC adapter Q2 for electrical or optical communication, and a modular adapter Q3 for telephone, to which a plug (not shown) is detachably connected, are arranged in a row. Then, the mounting frames 1A and 1B are mounted on the patch panel 11 so that the number of a connection port of a plug comes to twenty-four in total. After that, the patch panel 11 is installed in a fixed part such as a rack (not shown).

<Patch Panel Configuration>

As shown in FIGS. 1 and 6A to 6D, the patch panel 11 is formed into a substantially rectangular shape seen from the front and into a substantially U-shape seen from the side. The both ends in a longitudinal direction of the front of the patch panel 11 have a supporting plate part 13, on which a pair of elongated holes 13A are respectively bored, through which a mounting screw is inserted to fasten the patch panel 11 to the fixed part such as the rack. Further, a window opening 12 having a substantially rectangular shape is formed, on which the mounting frames 1A and 1B having a port specification different from one another are mounted side by side on the inside of the patch panel 11 by combining the mounting frames in array by a reasonable number. Tepura numbering N is fixed at the above and below of the front of the mounting frames 1A and 1B correspondingly to a position of an opening frame 2 to which various kinds of adapters Q1, Q2 and Q3 to be described later are attached. Further, a partition part 14 is provided at the center of the patch panel 11 for reinforcement, but this partition part 14 may be eliminated in case the patch panel 11 has sufficient strength and therefore can be dispensed therewith.

As shown in FIGS. 7A to 7D, as another example of the patch panel 11, the supporting plate part 13 on which a pair of elongated holes 13A are respectively bored may be formed, instead thereof, via a connecting plate 15 forwardly extending from the both ends in a longitudinal direction of the front of the patch panel 11. This secures a protection space in the front of the patch panel 11 for preventing excessive bending of a connecting part between a fragile plug and a cord (e.g., a boot part of an optical connector plug) when the patch panel 11 is installed in the fixed part such as the rack.

<Arrangement Structure of Mounting Frame>

Figure 12:
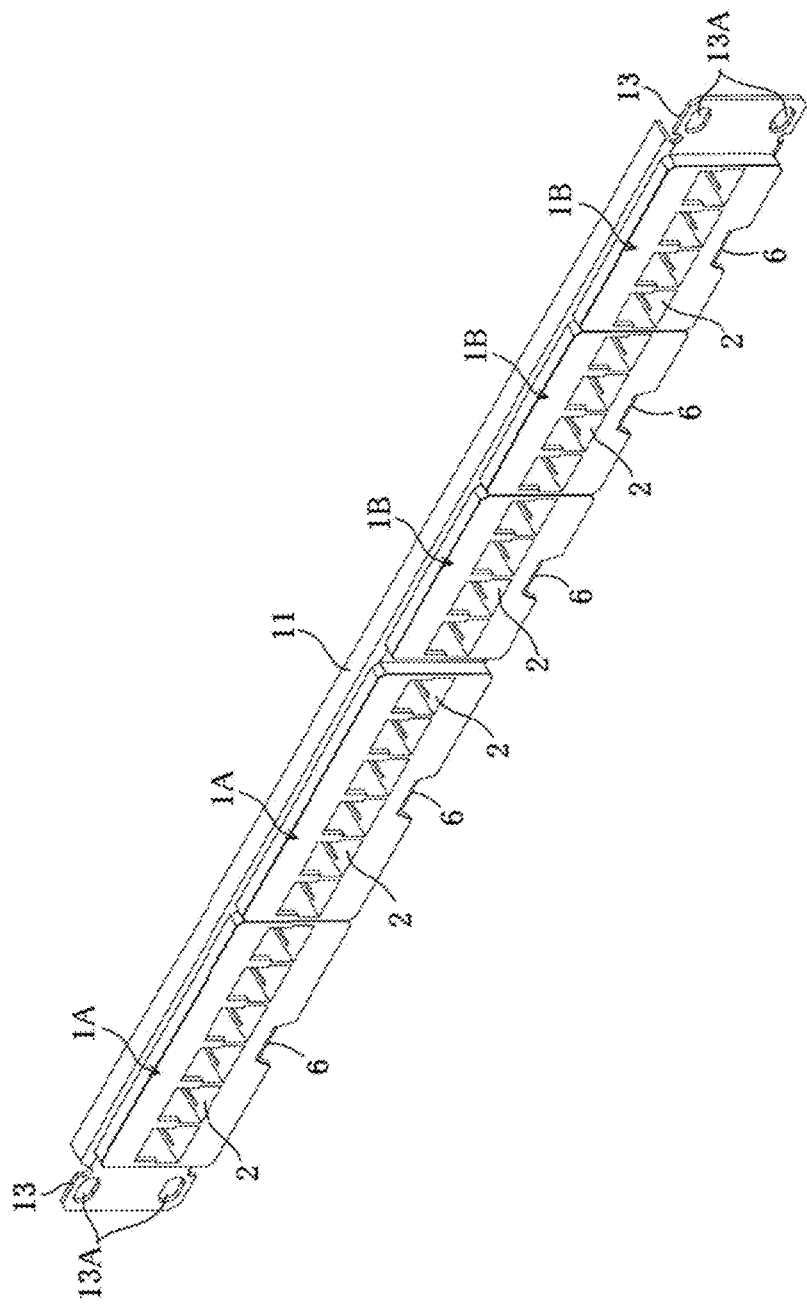
FIG. 12 is a perspective view of the patch panel on which the mounting frames having four ports and six ports in a state where the various kinds of adapters are detached, are mounted by combining the mounting frames.

As shown in FIG. 1, 3A to 3B, 5, 12, in the present embodiment, the mounting frames 1A and 1B having a port specification different from one another are mounted side by side in array by a reasonable number on the window opening 12 of the patch panel 11. In other words, there is provided two kinds of port frames including the mounting frame 1A (six port frame) having a six port specification shown in FIGS. 8A to 8E and 9A to 9C, and the mounting frame 1B (four port frame) having a four port specification shown in FIGS. 10A to 10E and 11A to 11C. As shown in FIG. 12, the three mounting frames 1B (four port frame) having a four port specification and the two mounting frames 1A (six port frame) having a six port specification are mounted in reasonable array on the window opening 12 of the patch panel 11, eventually coming to twenty-four ports in total.

Figure 3:
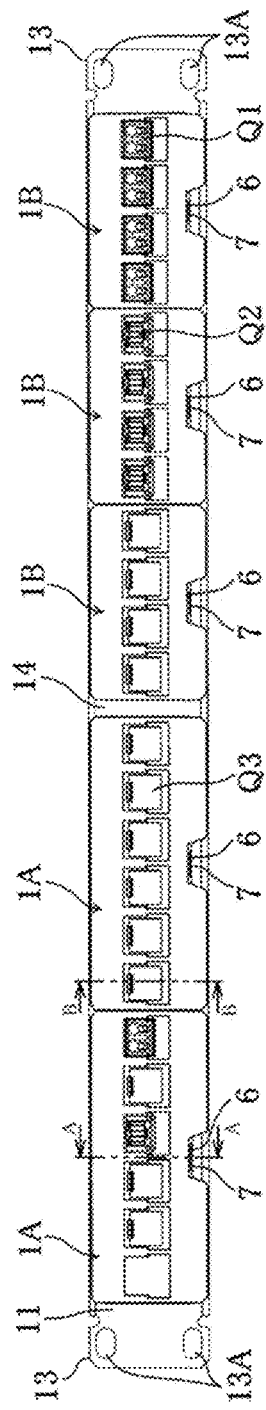

Specifically, as shown in FIGS. 1, 3A to 3B, the two mounting frames 1A (six port frame) having a six port specification and the three mounting frames 1B (four port frame) having a four port specification are arranged on the window opening 12 of the patch panel 11 side by side in a row along a direction from the left to the right seen from the front of he window opening 12 of the patch panel 11.

Figure 13:
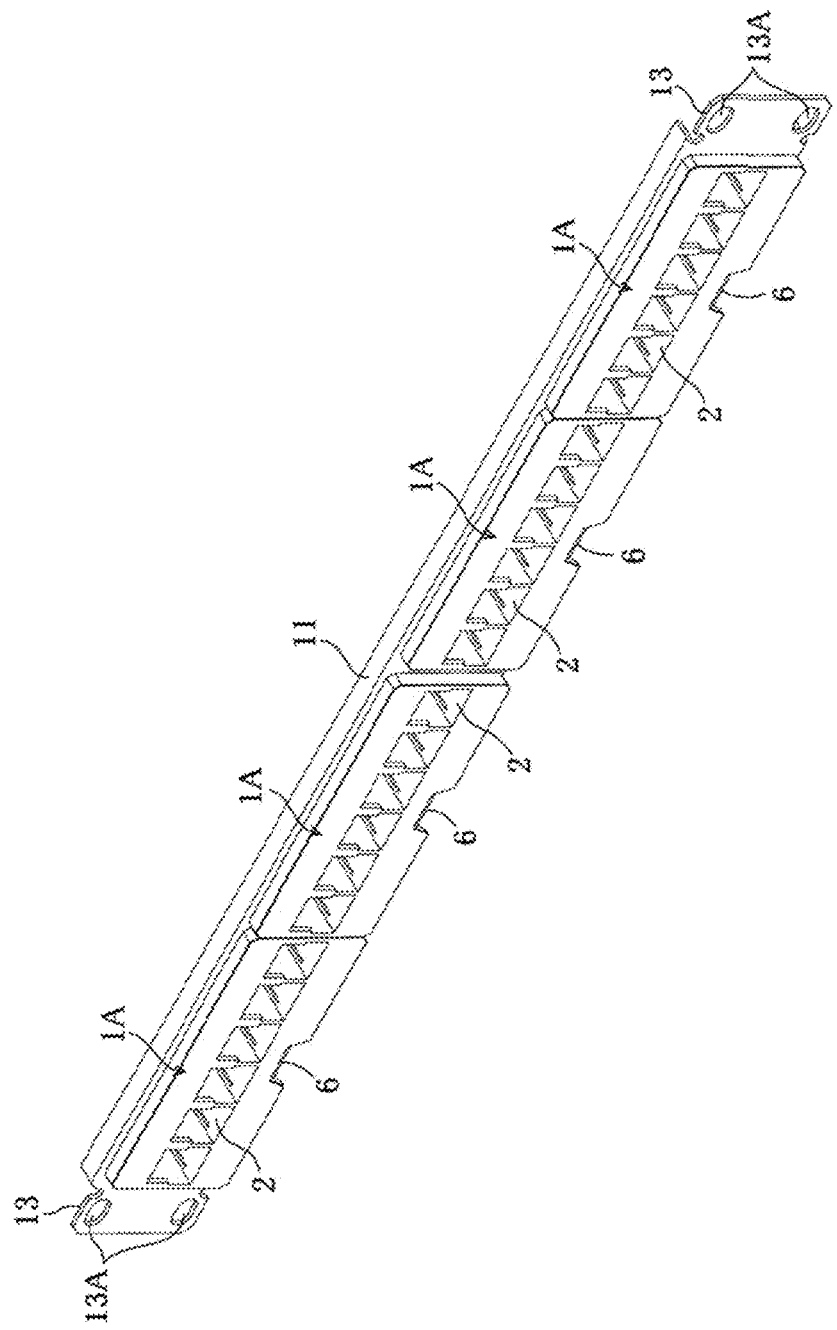
FIG. 13 is a perspective view of the patch panel on which the mounting frames having a plurality of six ports are mounted in a state where the various kinds of adapters are detached.

Further, as shown in FIG. 13, in a case where only the mounting frame 1A (six port frame) having a six port specification is used, the four mounting frames 1A (six port frame) are mounted in a row on the window opening 12 of the patch panel 11.

Figure 14:
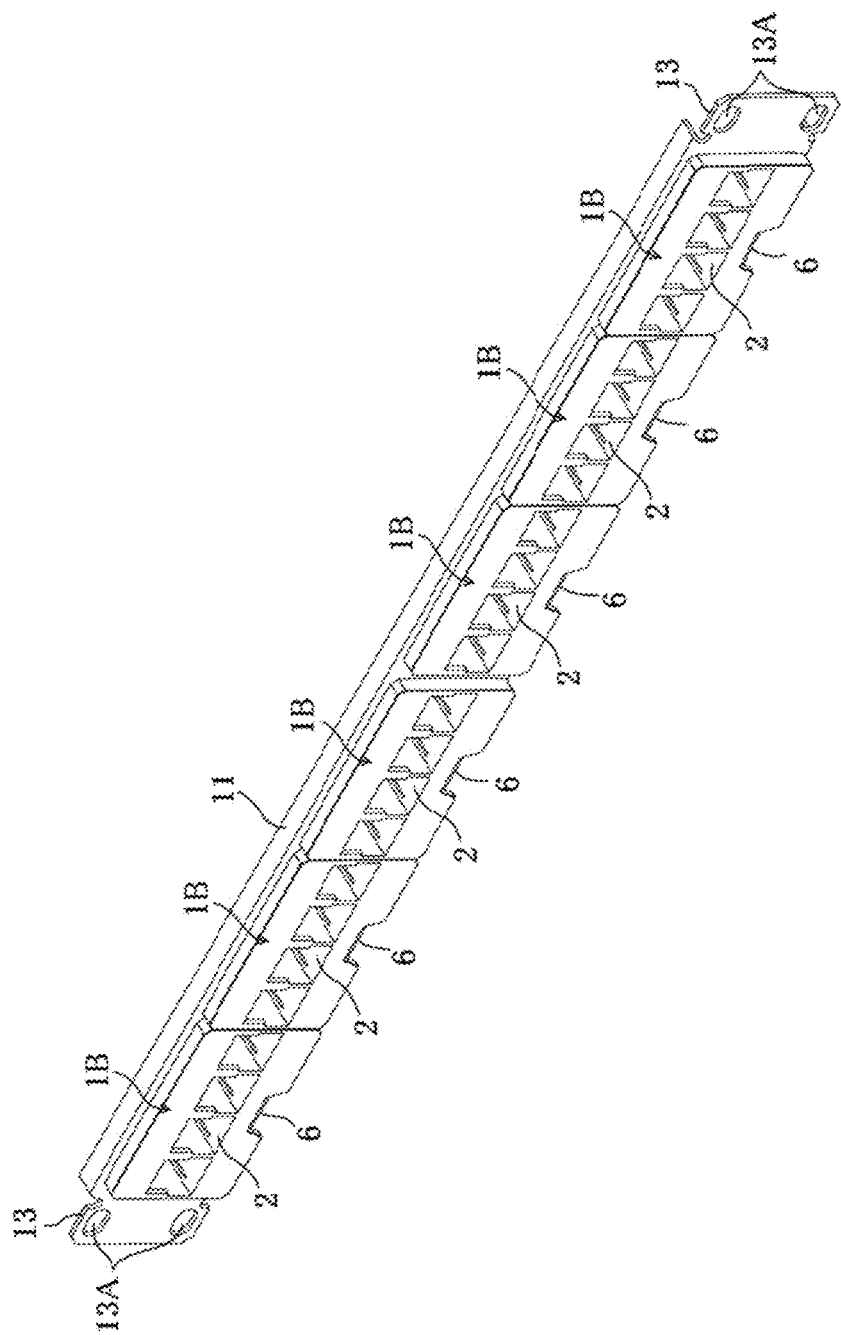
FIG. 14 is a perspective view of the patch panel on which the mounting frames having a plurality of four ports are mounted in a state where the various kinds of adapters are detached.
Figure 17F:
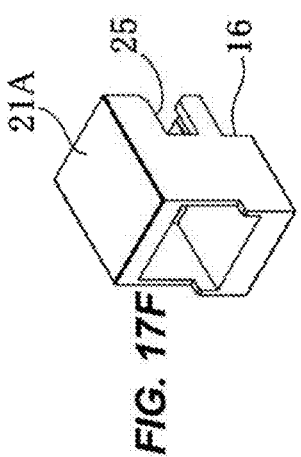
Figure 17E:
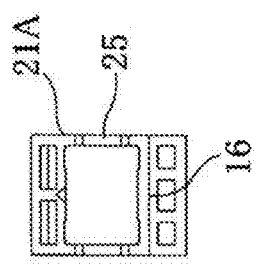
Figure 17G:
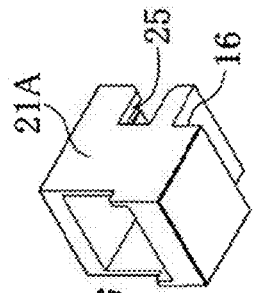
Figure 17D:
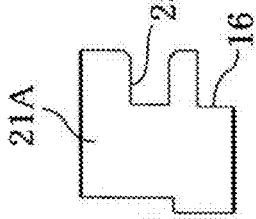
Figure 17A:
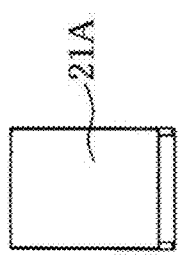
Figure 17B:
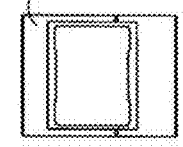
Figure 17C:
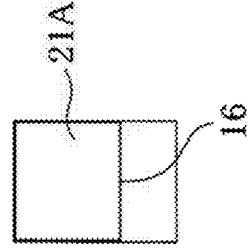

Furthermore, as shown in FIG. 14, in a case where only the mounting frame 1B (four port frame) having a four port specification is used, the six mounting frames 1B (four port frame) are mounted in a row on the window opening 12 of the patch panel 11.

<Attaching and Detaching Structure of Mounting Frames to Patch Panel>

The plurality of mounting frames 1A and 1B are inserted from the front of the patch panel 11 through the window opening 12. Namely, as shown in FIGS. 4A to 4D, 8A to 8D, 9A to 9C, 10A to 10D and 11A to 11C, a plurality of ribs 3 are formed on the inside of an upper edge of the mounting frames 1A and 1B. There is provided between the ribs 3 an engaging recessed part 5 having a laterally long rectangular recessed shape with and from which a plurality of projecting part 4 having a wide tong-like shape downwardly formed in a portion of the upper side opening edge of the window opening 12 of the patch panel 11 are engaged and disengaged.

Moreover, as shown in FIGS. 1, 2, 3A, 4A-4C, 5, 8B-8D, 9A-9C, 10B-10D, 11A-11C, 12, 13, and 14, there is provided at the center of the lower edge end of the mounting frames 1A and 1B a substantially trapezoidal cut-out part 6 having an ample space in vertical and horizontal width directions, to the extent that e.g. a thumb bulb side of a finger H can be inserted a little in an upward direction as shown in FIG. 1, or to the extent that a tool D such as a flathead screwdriver can be inserted.

As shown in FIGS. 3A, 5, 8B-8D, 9C, 10B-10D, and 11C, a horizontally long tabular engaged part 7 having elasticity is bridged over on the inside of the lower edge end of the mounting frames 1A and 1B in a state where the both ends thereof are fixed to the mounting frames 1A and 1B so that the engaged part 7 extends over the inside of the cut-out part 6.

As shown in FIGS. 4A to 4D, 8C-8D, 9C, 10B-10E, and 11C, there is provided in a lower surface of the engaged part 7 an engaging claw 8 whose end has a tapered surface 8A. When a lower part of the mounting frames 1A and 1B is pushed in a state where the tapered surface 8A is abutted against the lower side opening edge of the window opening 12 of the patch panel 11, the lower side opening edge of the opening window 12 moves along the tapered surface 8A while upwardly bending the center of the engaged part 7. This engages the engaging claw 8 with the lower side opening edge of the window opening 12.

The center of the engaged part 7 is upwardly bent e.g. by the thumb bulb side of the finger H through the cut-out part 6 formed in the center of the lower edge of the mounting frames 1A and 1B, or the center of the engaged part 7 is upwardly bent by inserting the tool D such as the flathead screwdriver into the cut-out part 6. This disengages the engagement of the engaging claw 8 with the lower side opening edge of the window frame 12 of the patch panel, thereby unmounting the mounting frames 1A and 1B from the window opening 12.

Figure 5:
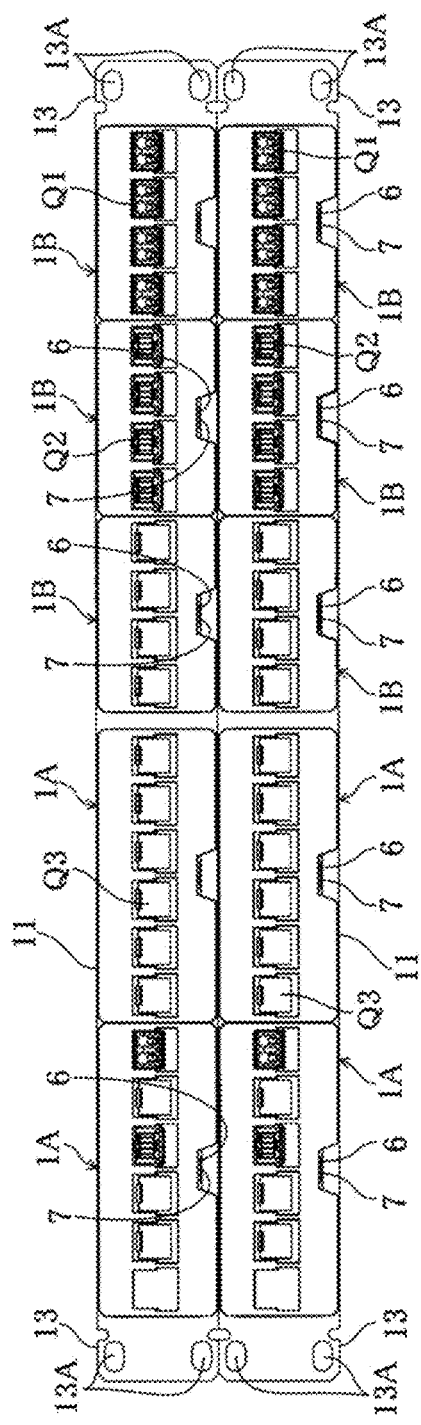
FIG. 5 is a front view in a state where the patch panel is arranged into upper and lower two stages on which the mounting frames having four port and six port specifications, to which the various kinds of adapters are attached, are mounted by combining the mounting frames.
Figure 8A:
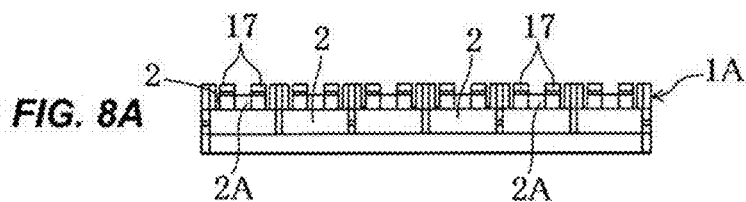
Figure 8B:
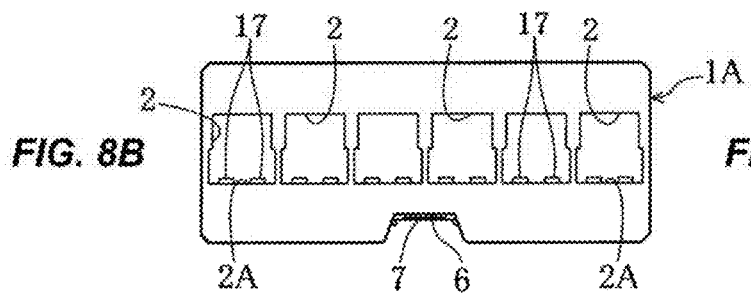
Figure 8E:
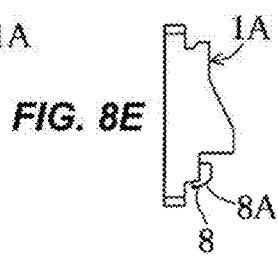
Figure 8C:
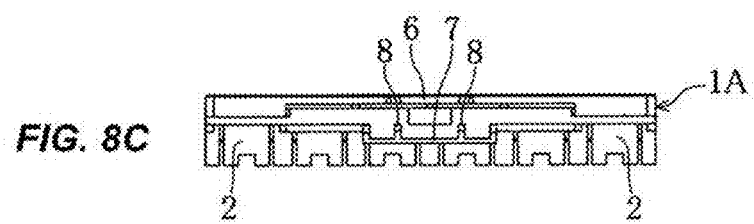
Figure 8D:
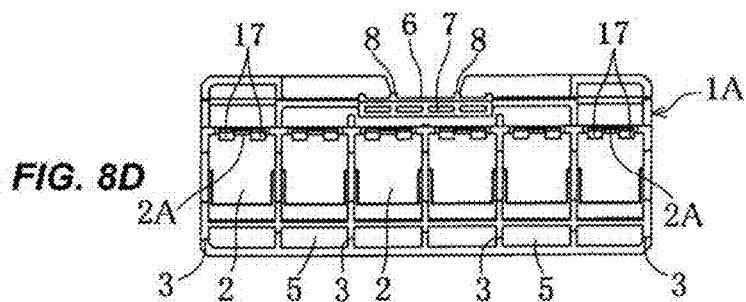
Figure 9A:
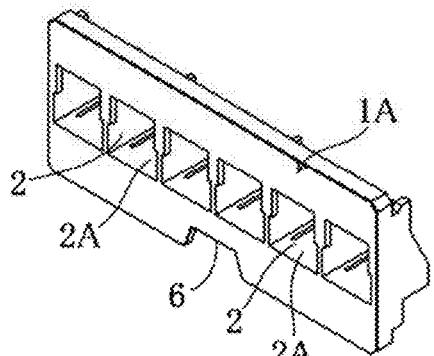
Figure 9B:
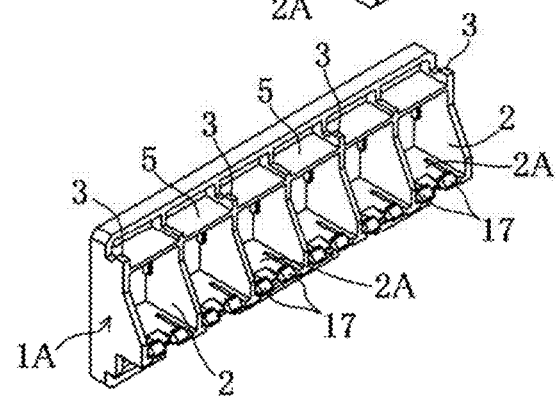
Figure 9C:
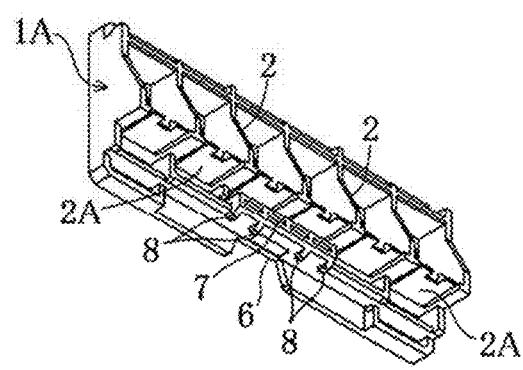
Figure 10A:
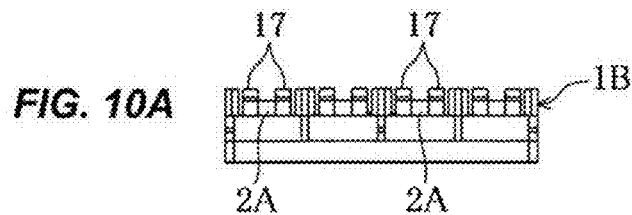
Figures 10B, 10E:
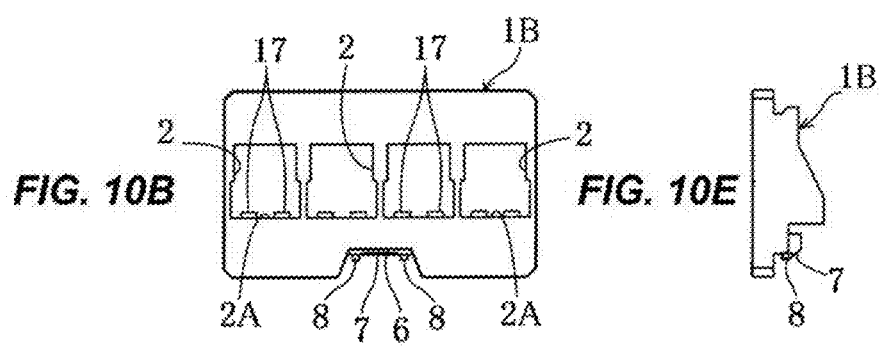
Figure 10C:
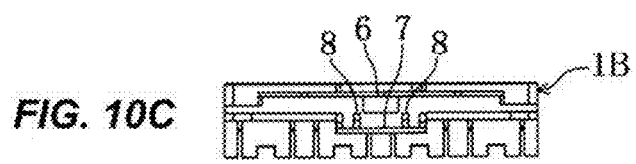
Figure 10D:
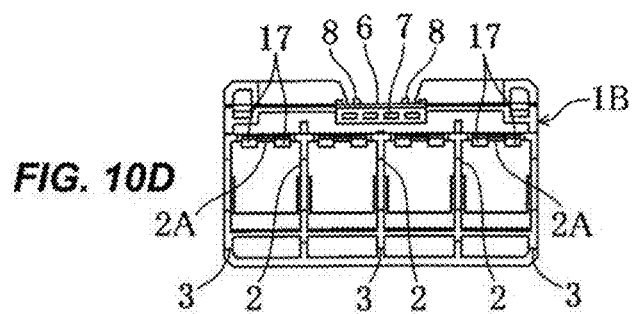
Figure 11A:
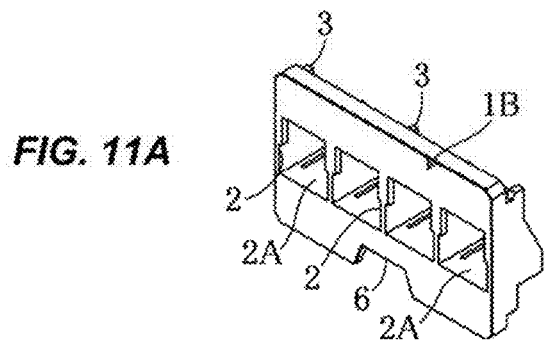
Figure 11B:
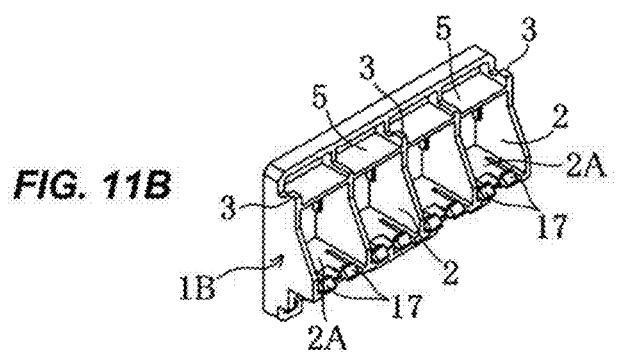
Figure 11C:
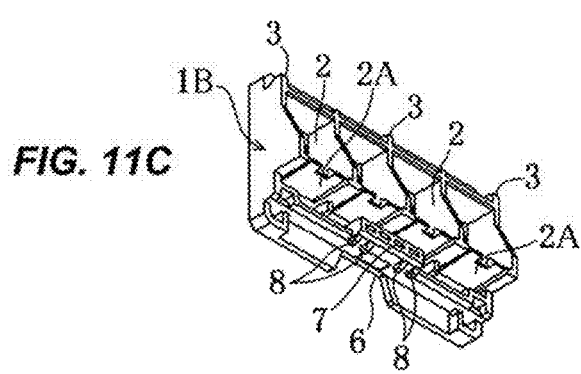

As shown in FIG. 5, even when the above-mentioned patch panel 11 is installed in the fixed part such as the rack in multiple stages in a vertical direction, an ample gap enough to easily insert the finger H and the tool D such as the flathead screwdriver through the cut-out part 6 between the mounting frames 1A and 1B of the upper and lower patch panels 11. Thus, the center of the engaged part 7 can be easily upwardly bent through the gap. This allows easy and smooth unmounting of the mounting frames 1A and 1B from the window opening 12 of the patch panel 11.

<Structure of LC Adapter Q1>

As shown in FIGS. 18A to 18I, the LC adapter Q1 is provided with a substantially box-shaped housing having integral structure whose both ends are opened, which is configured to be able to receive an optical connector from the both forward and backward directions. A shutter plate 42 is arranged in the fitting part in one direction of the housing 41 so as to be able to open and close on the inside of the shutter plate 42 to close the fitting part in a diagonal arrangement.

<Structure of SC Adapter Q2>

As shown in FIGS. 16A to 16I, the SC adapter Q2 includes a fitting part for an optical connector and a fitting part for another optical part, which are respectively provided at the both ends in forward and backward directions of a substantially box-shaped housing 51 so that their optical axes are aligned. There is provided in the fitting part of the optical connector of the housing 51 a shatter plate 52 which closes the fitting part in the diagonal arrangement, and a flat spring (not shown) which urges the shutter plate 52 in a closing direction. It is configured such that the optical connector is fitted to the fitting part of the housing 51, thereby opening the shutter plate 52 against a pressing force of the flat spring.

<Mounting Structure by Attachment of Adapter>

As shown in FIGS. 15A to 18I, the LC adapter Q1 and the SC adapter Q2 for electrical or optical communication are respectively inserted from the back into the opening frame 2 having a rectangular cylindrical shape which backwardly extends correspondingly to the ports arranged in a row on the mounting frames 1A and 1B through the attachments 21A and 21B correspondingly to the respective adapters Q1 and Q2. As shown in FIGS. 8A to 11C, a pair of left and right latch pieces 17 are provided in the lower wall part 2A of the opening frame 2, which oppose e.g. to the engaging part 16 having a stepped shape formed in the lower wall surface of the respective attachments 21A and 21B. When the latch pieces 17 are inserted from the back into the opening frame 2, the respective latch pieces 17 are engaged by the respective engaging part 16 of the respective attachments 21A and 21B.

As shown in FIGS. 15A to 16G, the attachment 21B of the SC adapter Q2 is formed of a bridge member having a rectangular cylindrical shape into which the housing 51 is inserted from the shutter plate 52 side. The attachment 21B is provided at its left and right sides with a rectangular cut-out groove 22 toward the front from the center of the rear end to form the attachment 21B in a substantially U-shape seen from the side. Further, there are provided in an inner bottom surface of the attachment 21B a pair of left and right guide rails 23 seen from the front.

As shown in FIGS. 16A to 16I, there are provided in the left and right wall surfaces of the connector housing 51 of the SC adapter Q2 a flange part 56 having a longitudinally elongated rectangular shape and an engaging projecting piece 53 projected in an obliquely protruding manner toward the front at the back side correspondingly to the flange part 56. When the connector housing 51 is installed in the attachment 21B, the connector housing 51 is clamped by the side of the back side of the cut-out part 22 at the side of the attachment between the flange part 56 and the engaging projecting piece 53, thereby preventing the connector housing 51 from coming off the attachment 21B by the engaging projecting piece 53. In this connection, in FIGS. 16A to 16I, reference numeral 24 denotes a key groove to insert and guide a key projection 54 formed in an upper wall surface of the connector housing 51.

As shown in FIGS. 17A to 17G, the attachment 21A of the LC adapter Q1 is formed of the ridge member having a rectangular cylindrical shape, which is inserted from the shutter plate 42 side. The attachment 21B is provided at its left and right sides with a cut-out groove 25 having a short rectangular shape toward the front from the center of the rear end.

As shown in FIGS. 18A to 18I, there is provided at the rear side of the left and right outer wall surface of the housing 41 of the LC adapter Q1 with an engaging projecting piece 55 in a protruding manner toward the front while applying elasticity thereto. When the housing 41 is installed in the attachment 21A, the housing 41 is prevented from coming off the attachment 21A by the action of an elastic force of the engaging projecting part 55.

<Structure of Modular Adapter for Telephone>

Figure 4:
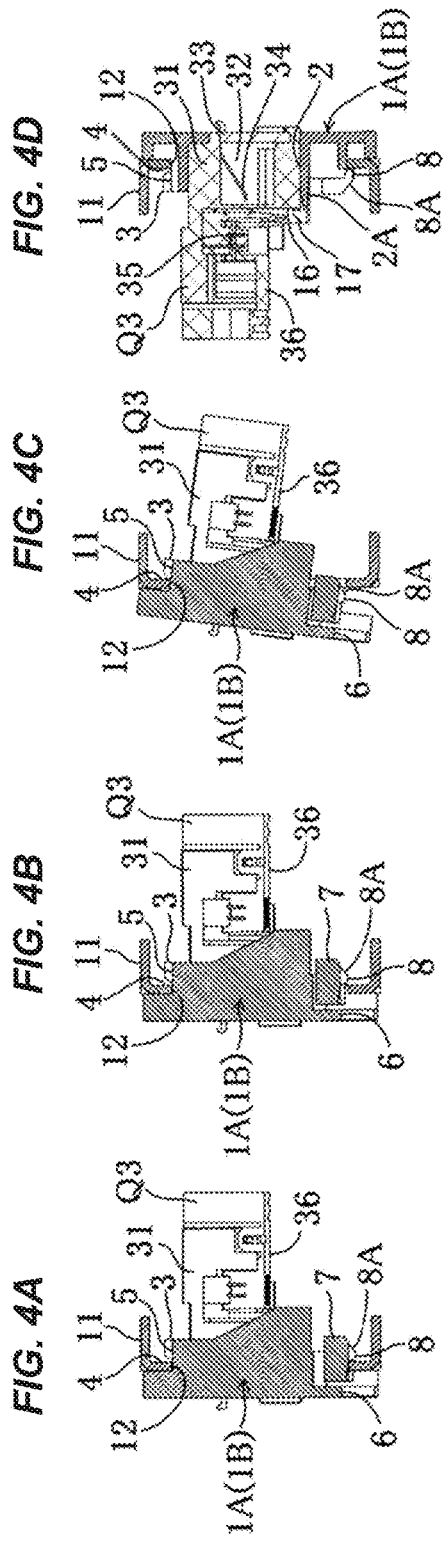

The modular adapter Q3 for telephone makes the direct use of the conventional modular jack structure. In other words, as shown in FIG. 4D, the opening frame 2 of the mounting frames 1A and 1B according to the present embodiment is configured such that when the conventional modular jack is inserted from the back, the latch piece 17 is engaged by the engaging part 16 formed in the housing 31 of the modular jack.

As shown in FIGS. 19A to 19H, the housing 31 is made of transparent synthetic resin having an insulation property and whose front is formed into a substantially rectangular shape. There is provided at the front of the housing 31 a plug insulation hole 32 into which a modular plug (not shown) is inserted is opened to the front of the housing 31, and is configured to be able to open and close by a slide type shutter 33. A plurality of contacts 34 are arranged in the plug insertion hole 32 so as to elastically contact with a contactor of the modular plug (see FIG. 4D).

As shown in FIG. 4D and FIGS. 19A to 19H, a plurality of terminals 35, each of which is electrically connected to the respective contacts 34, are projecting from an upper surface of the back of the housing 31. The terminals 35 called as an IDC terminal are commonly known and are a pressure-contact type terminal formed into a fork shape having a pressure-contact slit whose upper end edge is opened between a pair of teeth. The width of the pressure-contact slit is set to the extent that the both side edges of the pressure-contact slit press against a core wire of an electric wire to be connected. In other words, when an electric wire around which an insulating film is coated is forcibly inserted from the above, the core wire is introduced into the pressure-contact slit while peeling off the insulating film by cutting the insulating film of the electric wire at the both side ends of the pressure-contact slit, and then is clamped between the both side edges of the pressure-contact slit.

Further, as shown in FIG. 4D and FIGS. 19A to 19H, in order for the electric wire to be able to connect to the terminal 35 without using a separate tool and a jig, a cover that is a synthetic resin product having both an aligning function of collectively holding a plurality of electric wires and a pressing-in function of forcibly inserting the electric wire into the terminal 35 is provided in a back surface of the housing 31. The cover 36 can be attached and detached by a hook structure, and opened and closed between a position at which the cover 36 covers the terminal 35 projecting from the housing 31 and a position at which the terminal 35 is uncovered.

Thus, each pair of a UTP bundled type cable K (see FIG. 1) is held by the cover 36 and aligned to a predetermined terminal 35. The cover 36 covers the housing 31 side, thereby pressing each pair of the cable K against the predetermined terminal 35 to electrically connect to a predetermined contact 34.

As shown in FIG. 1, a dummy cap is fitted into the opening frame 2 corresponding to an unused port of the mounting frames 1A and 1B from the back. As shown in FIGS. 20A to 20F, the dummy cap 61 is formed into the substantially same rectangular cylindrical shape as the attachments 21A and 21B respectively corresponding to the LC adapter Q1 and the SC adapter Q2. However, only the front end surface thereof is closed by a closing plate 62.

There is provided at the left and right sides of the dummy cap 61 a cut-out groove 63 having a short rectangular shape toward the front from the center of the rear end. An engaging part 16 is provided at the lower wall surface of the dummy cap 61 in the same manner as the attachments 21A and 21B.

Next, a description will be given of one example of use as to the embodiment thus configured as above. As shown in FIGS. 4A to 4D, the conventional modular jack is inserted from the back side into the opening frame 2 of the mounting frames 1A and 1B. Simultaneously, as shown in FIGS. 15A to 18I, each of the LC adapter Q1 and the SC adapter Q2 for electrical or optical communication is inserted from the back side into the opening frame 2 having a rectangular cylindrical shape which backwardly extends from the mounting frames 1A and 1B through the attachments 21A and 21B.

As shown in FIGS. 1, 3A to 3B, the two mounting frames 1A (six port frame) having a six port specification and the three mounting frames 1B (four port frame) having a four port specification are arranged side by side in a row on the window opening 12 of the patch panel 11 along a direction from the left to the right seen from the front. In this case, when a lower part of the mounting opening frames 1A and 1B is pushed into while abutting the tapered surface 8A against the lower side opening edge of the window opening 12 of the patch panel 11, the lower side opening edge moves along the tapered surface 8A. Then, the center of the engaged part 7 is upwardly flexed, thereby engaging the engaging claw 8 with the lower side opening edge of the window opening 12.

The projecting part 4 having a plurality of wide tong-like shapes formed toward downward in the upper side opening edge of the window opening 12 of the patch panel 11 is engaged in the engaging recessed part 5, thereby mounting the respective mounting frames 1A and 1B on the window opening 12 of the patch panel 11.

When the mounting frames 1A and 1B are unmounted from the window opening 12 of the patch panel 11, the finger H or the tool D such as the flathead screwdriver is inserted into the cut-out part 6 formed in the center of the lower edge of the mounting frames 1A and 1B to push up the center of the engaged part 7, and then to upwardly flex. This disengages the engagement by the engaging claw 8 with the lower side opening edge of the window opening 12, and simultaneously the engagement in the engaging recessed part 5 of the plurality of projecting parts 4 provided in the upper side opening edge side of the window opening 12, thereby allowing easy unmounting of the mounting frames 1A and 1B from the patch panel 11.

While alternative illustrations are refrained from being individually demonstrated in detail herein, the present invention may be carried out, with various modifications added thereto, without departing from the scope of the present invention.

REFERENCE SIGNS LIST

Q1: LC adapter
Q2: SC adapter
Q3: modular adapter for telephone
H: finger
D: tool
N: tepura numbering
K: cable
1A,1B: mounting frame
2: opening frame
2A: lower wall part
3: rib
4: projecting part
5: engaging recessed part
6: cut-out part
7: engaged part
8: engaging claw
8A: tapered surface
11: panel
12: window opening
13: supporting plate part
13A: elongated hole
14: partition part
15: connecting plate
16: engaging part
17: latch piece
21A,21B: attachment
22: cut-out groove
23: guide rail
24: key groove
25: cut-out groove
31: housing
32: plug insertion hole
33: shutter
34: contactor
35: terminal
36: cover
41: housing
42: shutter plate
51: housing
52: flange part
53: engaging projecting piece
55: engaging projecting piece
56: flange part
61: dummy cap
62: closing plate
63: cut-out groove

The invention claimed is:

1. The patch panel on which a plurality of mounting frames (1A,1B), to which various kinds of adapters including a SC adapter (Q2) and a LC adapter (Q1) for electrical or optical communication, and a modular adapter (Q3) for telephone are attached by appropriately combining the adapters (1A,1B), are mounted in an insertable manner through a window opening (12) from the front side of the patch panel (11), wherein the patch panel (11) is provided with the window opening (12) set to a predetermined length dimension so that the mounting frames (1A,1B) having a port specification different from one another can be mounted by combining the mounting frames (1A,1B) in array by a reasonable number.

2. The patch panel according to claim 1, wherein the mounting frames (1A,1B) having the port specification different from one another are two types of port frames including a mounting frame (1B) having a four port specification (four port frame) and a mounting frame (1A) having a six port specification (six port frame), and these mounting frames (1A,1B) are mounted by combining the mounting frames (1A,1B) in array by a reasonable number on the window opening (12) of the patch panel (11) so that the number of the port comes to twenty-four in total.

3. The patch panel according to claim 1, wherein the various kinds of adapters including the SC adapter (Q2) and the LC adapter (Q1) for electrical or optical communication, and the modular adapter (Q3) for telephone are inserted from the back into an opening frame (2) corresponding to a port provided in a row in the mounting frames (1A,1B) through attachments (21A,21B) corresponding to the respective adapters (Q1,Q2,Q3), and the opening frame (2) is provided with a latch piece (17) opposed to the engaging part (16) formed in a wall surface of the respective attachments (21A,21B), and the latch piece (17) is engaged by the engaging part (16) of the opening frame (2) when the adapters (Q1,Q2,Q3) are inserted from the back into the opening frame (2).

\* \* \* \* \*